US005488522A

United States Patent [19]
Peace et al.

[11] Patent Number: 5,488,522
[45] Date of Patent: Jan. 30, 1996

[54] EJECTION APPARATUS FOR EJECTING STORAGE MEDIA POSITIONED IN A COMPUTER MASS STORAGE MEDIA DRIVE

[75] Inventors: Steven L. Peace, Fort Collins; Terry A. Precht, Loveland, both of Colo.

[73] Assignee: ComByte, Inc., Ft. Collins, Colo.

[21] Appl. No.: 337,740

[22] Filed: Nov. 14, 1994

[51] Int. Cl.[6] .................................................. G11B 25/10
[52] U.S. Cl. ..................................... 360/99.06; 360/99.02
[58] Field of Search .................. 360/99.06, 97.01–97.03, 360/99.02, 92, 132

[56] References Cited

U.S. PATENT DOCUMENTS

| 4,984,108 | 1/1991 | Grant et al. | 360/92 |
| 5,220,552 | 6/1993 | Yokoi et al. | 369/77.2 |
| 5,260,922 | 11/1993 | Chigasaki | 360/99.06 X |

FOREIGN PATENT DOCUMENTS

| 0366118 | 5/1990 | European Pat. Off. | 360/99.06 |
| 0526215 | 2/1993 | European Pat. Off. | 360/99.06 |

OTHER PUBLICATIONS

Computer Technology Review, Dec. 1994, p. 30.
"Two . . . Two . . . Two Drives in One " by Mark Ferrelli. Dataquest Alert, Nov. 1994, pp. 1–3.
"Double Your Pleasure * * * " by Fara Yale. Reseller News, Dec. 1994.
"Combyte–Double Play Series 1".

Primary Examiner—John H. Wolff
Attorney, Agent, or Firm—William J. Kubida; Holland & Hart

[57] ABSTRACT

Ejection apparatus for a computer mass storage media drive. The media drive includes two insertion openings for receiving two different storage media. An actuation arm receives an actuation force for initiating ejection of storage media position within the media drive out of the media drive. The actuation arm, when actuated, initiates the ejection of either a storage media inserted into the media drive by way of a first of the two insertion openings or a storage media inserted into the media drive by way of a second of the two insertion openings.

9 Claims, 7 Drawing Sheets

EJECTION APPARATUS FOR EJECTING STORAGE MEDIA POSITIONED IN A COMPUTER MASS STORAGE MEDIA DRIVE

CROSS-REFERENCE TO RELATED APPLICATIONS

The present application is related to commonly-assigned patent application Ser. No. 08/072,919, filed Jun. 7, 1993, and entitled DUAL RANDOM AND SEQUENTIAL ACCESS MEDIA DRIVE. The present application is further related to commonly-assigned patent application Ser. No. 08/334,558, filed Nov. 4, 1994, and entitled REMOVABLE STORAGE MEDIA DRIVE AND METHOD FOR BIASING A CARTRIDGE ASSEMBLY TOWARD A DRIVING ROLLER, to commonly-assigned patent application Ser. No. 334,564, filed Nov. 4, 1994, and entitled OVER-CENTER VARIABLE STROKE LATCHING MECHANISM AND METHOD FOR A TAPE DRIVE, and to commonly-assigned patent application Ser. No. 08/337,724, filed concurrently herewith and entitled STORAGE MEDIA LOCK-OUT DEVICE FOR A STORAGE MEDIA DRIVE.

BACKGROUND OF THE INVENTION

The present invention relates generally to a combined computer mass storage media drive operable to receive storage media through two separate insertion openings of the media drive. More particularly, the present invention relates to ejection apparatus for ejecting storage media received within the media drive. Only a single actuator is required to be actuated to cause ejection of the storage media received in the media drive by way of either of the insertion openings. In an embodiment in which the media drive is operative to receive a tape cartridge, the ejection apparatus also permits the tape cartridge to be removed from the media drive by application of a withdrawal force applied directly to the tape by an operator of the media drive without requiring actuation of the actuator.

Tape drives which allow for the archiving of computer files and application software on various sequential access media are well-known. Among the most popular tape formats for performing archival storage in conjunction with personal computers, file servers and the like, is the industry standard quarter-inch cartridge ("QIC") tape and specific drives for reading and writing such media are now generally available in half-height (1.625 inches) and one-inch form factors.

Analogously, disk drives which allow for the archiving of computer files and application software on various random access media are also well-known. Among the most popular disk formats for performing archival storage in conjunction with personal computers, file servers and the like, are five and one-quarter inch (5.25 inch) and three and one-half inch (3.5 inch) disks. Specific drives for reading data from and writing data to such media are also now generally available in half-height and one-inch form factors.

A conventional disk drive includes an insertion opening permitting insertion of a media disk into the disk drive to be received therein. Once inserted into the disk drive, read and/or write operations may be performed upon the media disk. To facilitate later removal of the media disk out of the disk drive, many disk drives include ejection apparatus. The ejection apparatus typically includes an actuator which, when actuated, initiates ejection of the media disk out of the disk drive. The actuator typically extends beyond a face plate, or other housing portion, of the disk drive to permit an operator to actuate the actuator.

Analogously, a conventional tape drive includes an insertion opening permitting insertion of a tape cartridge into the tape drive to be received therein. Once inserted into the tape drive, read and/or write operations may be performed upon the tape cartridge. To facilitate later removal of the tape cartridge out of the tape drive, some conventional tape drives include ejection apparatus, operable analogous to operation of the ejection apparatus of a disk drive. More typically, though, removal of a tape cartridge out of a conventional tape drive is effectuated by an operator grasping the tape cartridge and directly applying a withdrawal force to the tape cartridge. Application of the withdrawal force directly to the tape cartridge is possible as a portion of the tape cartridge typically extends beyond the tape drive. Such portion of the tape cartridge is grasped by the operator to effectuate the removal of the tape cartridge out of the tape drive.

The aforementioned co-pending application Ser. No. 08/072,919 discloses a dual random and sequential access media drive for a computer system. The dual media drive forms a common media drive for writing data to, and/or reading data from, both a floppy disk and a tape cartridge. The dual random and sequential access media drive is particularly advantageous as the physical dimensions, power requirements, and costs associated with the dual media drive are significantly less than that of separate drives.

In the development of the dual media drive, conventional ejection apparatus for ejecting the floppy disk and the tape cartridge could have been provided. That is to say, the dual drive could have been developed to include two actuators. One of the actuators would be operable to form a portion of ejection apparatus of the tape drive portion, and the other of the actuators would be operable to form a portion of ejection apparatus of the disk drive portion of the dual drive. Or, the dual drive could have been developed to include an actuator operable to form a portion of ejection apparatus of the disk drive portion of the combined drive and removal of a tape cartridge out of the combined drive could have been provided solely by the direct application of a withdrawal force by an operator of the drive.

However, for reasons of ergonomics, it would be desirable to provide ejection apparatus having a single actuator which, upon actuation thereof, causes the ejection of either type of storage media out of the drive. If a single actuator, when actuated, initiates ejection of either type of storage media received at the dual drive, the knowledge of operation of the dual media drive required to be known by the operator of the media drive would be minimized as the operator would not be required to associate a particular actuator with a particular portion of the dual media drive.

It is with respect to these considerations and other background information relative to computer mass storage media drives that the significant improvements of the present invention have evolved.

SUMMARY OF THE INVENTION

The present invention advantageously provides ejection apparatus for a dual media drive. Once storage media is received within the media drive by way of an appropriate insertion opening, and an operator of the media drive thereafter decides to eject the storage media out of the media drive actuation of a single actuator initiates ejection of the storage media out of the drive. The storage media is ejected out of the media drive by way of the same insertion opening through which the storage media had previously been inserted to be received within the media drive.

When the dual media drive forms a common media drive for writing data to, and/or reading data from, both a floppy disk and a tape cartridge, the single actuator, when actuated, initiates ejection of either type of storage media out of the media drive. Because only a single actuator is required to eject either type of storage media out of the media drive, the knowledge of operation of the combined drive required to be known by an operator of the media drive is minimized as the operator is not required to associate a particular actuator with a particular portion of the media drive.

In accordance with the present invention, therefore, ejection apparatus for a computer mass storage media device is disclosed. The ejection apparatus has a first insertion opening for receiving a first storage media at a first storage media receiving position and a second insertion opening for receiving a second storage media at a second storage media receiving position. An ejection force generating mechanism generates an ejection force to eject the first storage media out of the first storage media receiving position when positioned thereat and ejects the second storage media out of the second storage media receiving position when positioned thereat. An actuator is operative, when actuated, to initiate generation of the ejection force by the ejection force generating mechanism.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
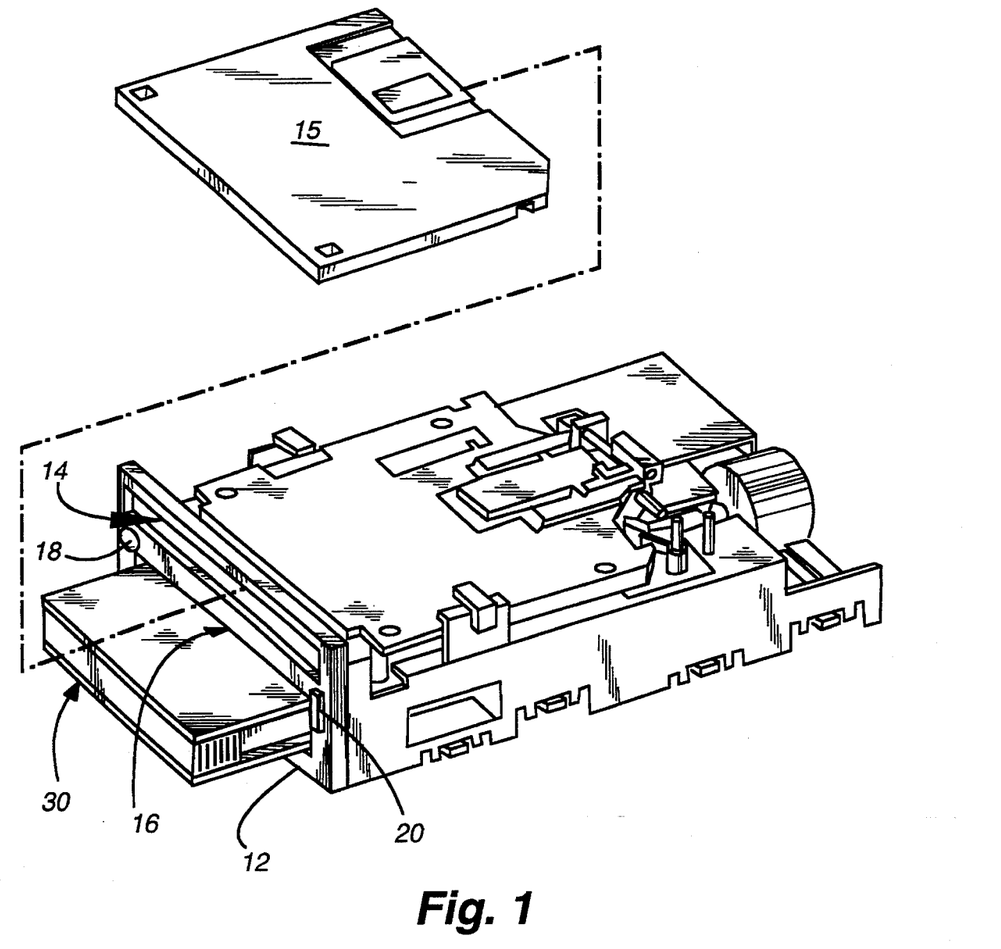
FIG. 1 is a perspective view of a dual media drive as disclosed in U.S. patent application Ser. No. 08/072,919 in which the device and method of the present invention may be embodied.

With reference first to FIG. 1, a dual media drive, shown generally at 10, which utilizes the media lockout device, and associated method, of the present invention is shown. The drive 10 may be used in conjunction with both random access media (such as microdiskettes, floppy diskettes, floptical disks, CDROMs, and the like) in addition to sequential access media (such as QIC tape, 8 mm tape, DAT, Data cassettes, and the like). In the embodiment of the dual media drive 10 illustrated herein, it should be noted that description is made only by way of example with respect a 3.5 inch magnetic diskette and a QIC tape cartridge.

The drive 10 is more fully described in U.S. Pat. application Ser. No. 08/072,919 filed Jun. 7, 1993, entitled "Dual Random and Sequential Access Media Drive" assigned to ComByte, Inc., assignee of the present invention. As therein disclosed, the drive 10 comprises a user accessible end having a bezel 12 which allows for insertion of a diskette 15 within the diskette insertion opening 14 in order for the drive 10 to read and/or write data to the media.

The drive 10 also incorporates a tape cartridge insertion opening 16 which allows for the insertion of a tape cartridge 30 as shown. That is to say, FIG. 1 illustrates the tape cartridge inserted through the insertion opening 16 to be positioned at a tape cartridge receiving position whereat read and/or write operations can be performed upon the tape. Alternately, the diskette 15 can be inserted through the insertion opening 14 to be positioned at a diskette receiving position whereat read and/or write operations can be performed upon the diskette.

The bezel 12 of the drive 10 also includes a drive activity light 18 to indicate to a user that the storage media within the diskette seated within diskette insertion opening 14 at the diskette receiving position or, alternatively, the tape cartridge assembly 30 inserted within the tape cartridge insertion opening 16 at the tape cartridge receiving position is being moved. A media ejection button 20 is also included to initiate ejection of the diskette and the tape cartridge out of the drive 10.

It should also be noted that in most applications utilizing a QIC tape cartridge assembly 30, a portion of the cartridge, when positioned at the tape cartridge receiving position drive 10, protrudes through the tape cartridge insertion opening 16. Such portion of the cartridge 16 allows an operator to grasp the tape cartridge assembly 30 to manually effectuate its removal.

In a particular application, the drive 10 may be mounted within a user-accessible drive bay of a computer, work station, file server, or other similar computer equipment such that the bezel 12 is exposed to allow insertion of either the diskette 15 or the tape cartridge assembly 30. In alternative applications, the drive 10 may be utilized in conjunction with a separate housing presenting an electrical interface for connection to a standard computer bus or peripheral interface such as PCMCIA.

As will be more fully discussed hereinafter, it should be recognized that although a drive 10 for utilization in conjunction with a diskette 15 and a tape cartridge 30 is shown, the principles of the present invention are equally applicable to other combined media drives.

Figure 2:
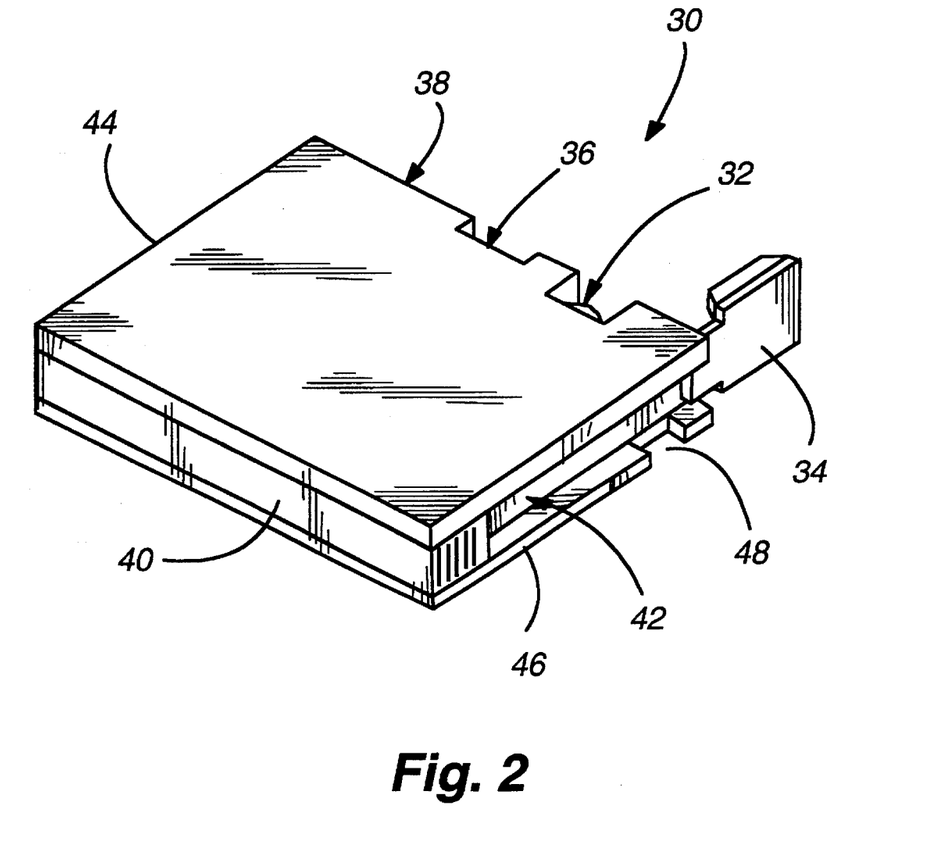
FIG. 2 is a perspective view of a tape cartridge which may be inserted into an insertion opening of the combined drive shown in FIG. 1.

With reference additionally to FIG. 2, the tape cartridge 30 is again shown. In the embodiment illustrated, the tape cartridge 30 comprises an industry standard QIC tape cartridge. The tape cartridge 30 incorporates a read/write head access opening 32 formed in the cartridge inner edge 38 thereof for allowing the data transducer of the associated tape drive to read and/or write data to the internal storage media. The tape cartridge 30 further includes an internal puck access opening 36 by means of which a driving roller associated with a tape drive (hidden from view in the illustration of the drive 10 shown in FIG. 1) can frictionally engage and drive the driven roller (or puck) to move the media within the tape cartridge 30. As shown, the read/write head access opening 32 may further include a media access door 34 which serves to protect the storage media within the tape cartridge assembly until such time as the tape cartridge 30 is inserted and engaged within an associated drive.

The tape cartridge 30 further includes a cartridge outer edge 40 which, together with other portions of the cartridge, may generally protrude beyond the bezel 12 of the drive 10 shown in FIG. 1. Additionally, the tape cartridge 30 further includes a cartridge right edge channel 42 and corresponding cartridge left edge channel 44 both comprising a recessed slot along the respective edges of the tape cartridge 30. As shown, the cartridge right edge channel 42 is formed, in part, by a peripherally extending flange 46 into which is formed an engagement notch 48 for securing the cartridge within the associated drive as will be more fully described hereinafter. In a corresponding manner, the cartridge left edge channel 44 also includes a peripherally extending flange 46 and engagement notch 48 (not shown).

Figure 3:
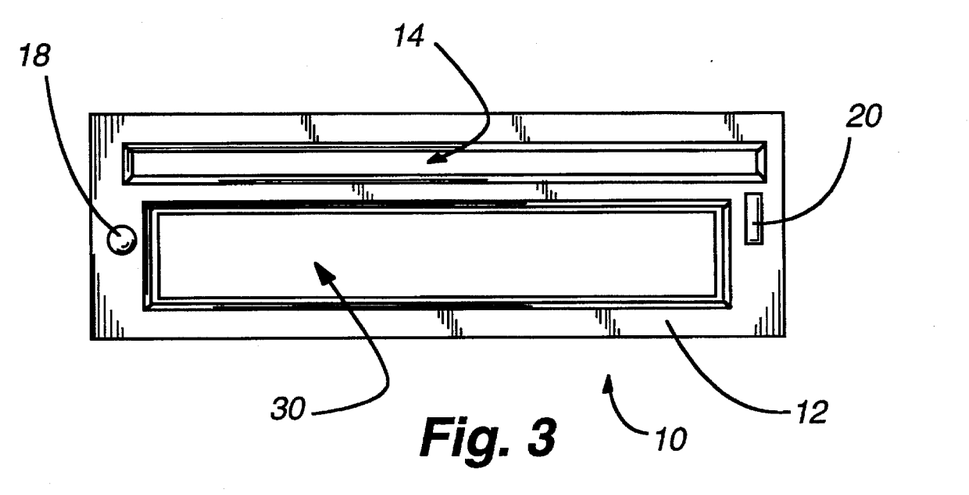
FIG. 3 is a front elevational view illustrating the insertion openings of the combined media drive shown in FIG. 1.

With reference additionally now to FIG. 3, a front elevational view of the combined drive 10 illustrated in FIG. 1 is shown. With respect to the combined drive 10 shown in FIG. 3, like structure to that previously described with respect to FIG. 1 is like numbered and the foregoing description thereof shall suffice herefor.

Figure 4:
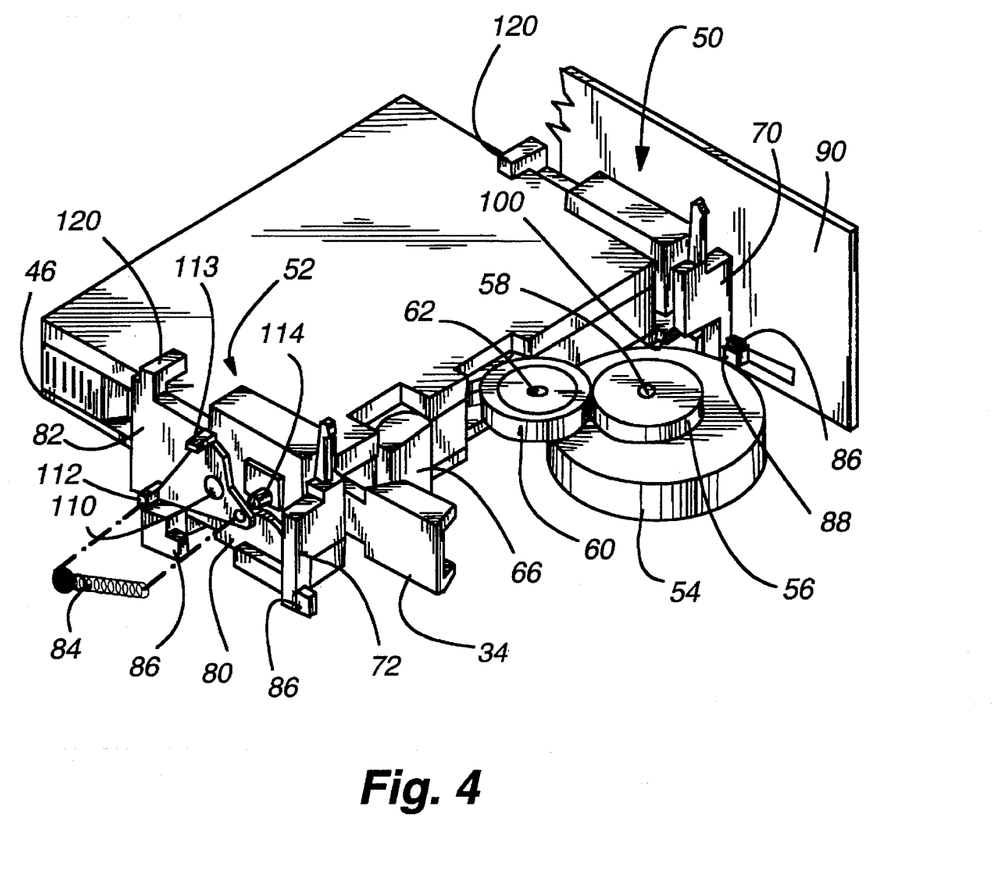
FIG. 4 is a perspective, cutaway view of the tape cartridge shown in FIG. 2 inserted within the dual media drive of FIG. 1.

FIG. 4 illustrates the tape cartridge 30 positioned within the media drive 10 to be received at a tape cartridge receiving position whereat read and/or write operations may be performed upon the cartridge 30. To position the cartridge 30 at the receiving position, the cartridge is generally guided within the tape cartridge insertion opening 16 for retention in proper biasing within the drive 10 by means of a pair of left and right guide members 50 and 52 which form, in part, a left edge and a right edge guide rail, respectively.

The drive 10 includes a media drive motor 54 which provides rotational motion to a drive wheel 56 coupled to the drive shaft of the motor which revolves about an axis of rotation 58. The drive wheel 56 frictionally engages and rotates a driving roller 60 about an axis of rotation 62. The driving roller 60 here comprises an idler capstan having a substantially fixed axis of rotation in conjunction with a substantially fixed axis of rotation of the drive wheel 56. When utilized in conjunction with the dual media drive 10 in which the driving roller 60 also serves as the rotational platform for the movement of an associated random access media (such as the 3.5 inch microdiskette, CDROM, "floptical" diskette and the like), a precise axis of rotation is required.

When the tape cartridge 30 is positioned at the cartridge receiving position, a driven roller (hidden from view in the figure) frictionally engages the driving roller 60 and drives the media, or tape, of the cartridge 30 within the body of the cartridge to move the tape with respect to a tape head 66 comprising a read/write transducer for reading and/or writing data to the tape of the cartridge 30.

FIG. 4 further illustrates left and right guide rails 70 and 72 of the left and right guide members 50 and 52, respectively. Further details of the guide rails 70 and 72 are described in copending patent application Ser. No. 08/334,564, entitled OVERCENTER VARIABLE STROKE LATCHING MECHANISM AND METHOD FOR A TAPE DRIVE, and the contents thereof are here incorporated by reference.

Figure 5:
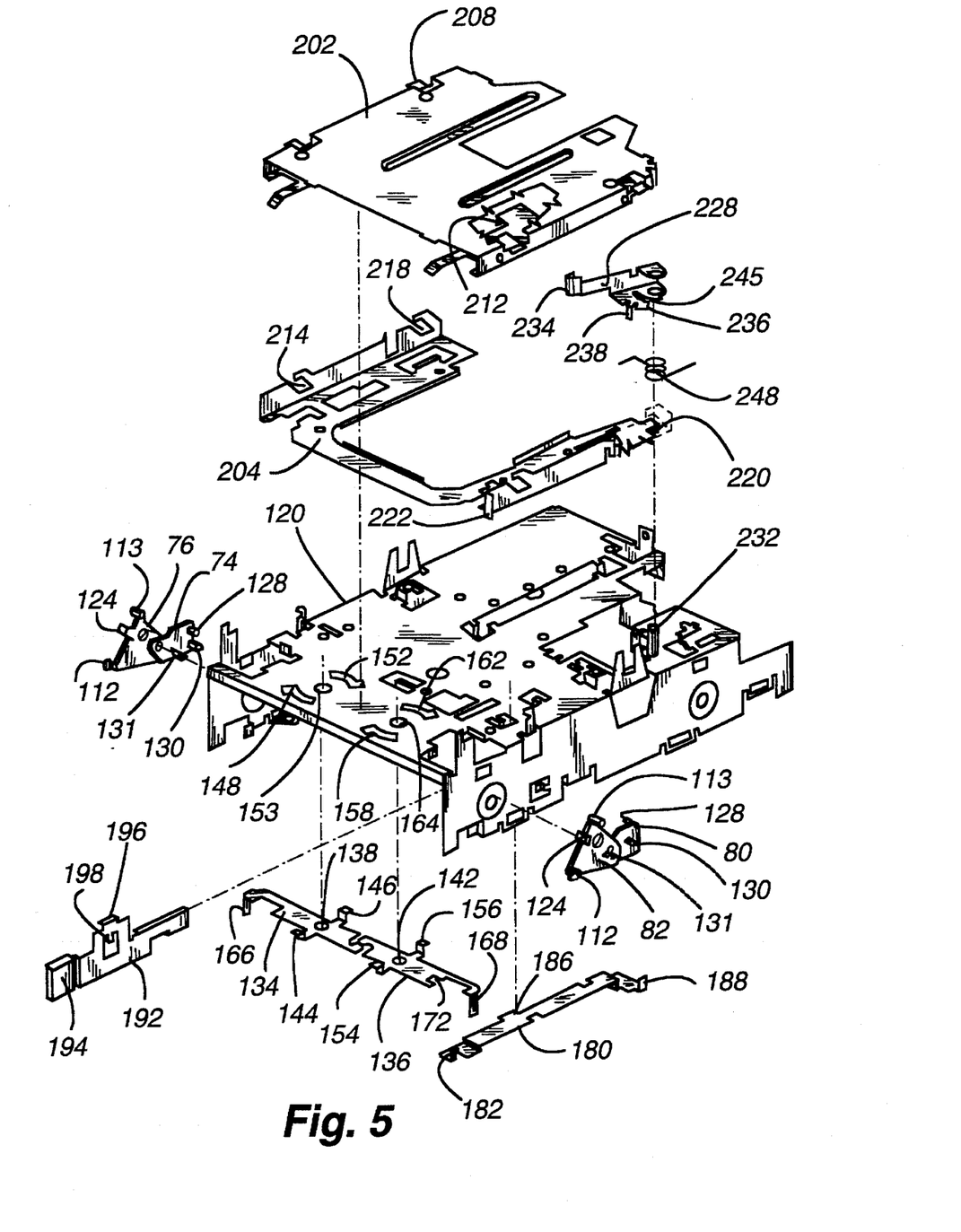
FIG. 5 is an exploded view of portions of the media drive shown in FIG. 1, including the media lockout device of an embodiment of the present invention.

The left guide rail 70 is operative in conjunction with a left crank 76 and left slider 74. Both are hidden from view in FIG. 4, but are illustrated in FIG. 5, and shall be described in detail below.

The right guide rail 72 is operative in conjunction with a right slider 80 and a right crank 82. A right extension spring 84 interconnects the right crank 82 to the right guide rail 72. An analogous extension spring interconnects the left crank and the left guide rail 70.

The guide rails 70 and 72 include a number of mounting tabs 86 for engaging with corresponding retaining tabs 88 formed upon the enclosure walls 90 of the drive 10. In this manner, the left and right guide rails 70 and 72 are maintained in a fixed position with respect to the tape cartridge insertion opening 16 of the drive 10 for maintaining the tape cartridge 30 in a substantially fixed plane with respect to the driving roller 60 and the tape head 66.

The left and right guide rails 70 and 72 each incorporate a flange channel for respectively receiving the left and right peripherally extending flanges 46 of the tape cartridge 30. In like manner, the left and right guide rails 70 and 72 each incorporate channel guides which extend longitudinally of the respective cartridge right edge channel 42 and cartridge left edge channel 44 when the cartridge 30 is inserted between the left and right guide members 50 and 52.

The left guide rail 70 further incorporates a stop 100 for engaging a leading edge of the tape cartridge 30 at the cartridge inner edge 38 thereof. The right guide rail 72 does not incorporate a corresponding structure to the stop 100.

The right crank is permitted limited rotational movement about pivot 110 and includes tangs 112 and 113. A spring tang 114 is further illustrated in the figure.

In general, the left and right guide members 50 and 52 are operative to retain and latch the tape cartridge 30 in position and to urge the front edge of the tape cartridge 30 against the stop 100. Such positioning of the cartridge at the tape cartridge receiving position permits read and/or write operations to be performed upon the tape of the cartridge 30.

The media lockout device of an embodiment of the present invention engages with the guide members 50 and 52 to prevent positioning of the tape cartridge 30 in the tape cartridge receiving position when a diskette, such as the diskette 15 shown in FIG. 1, is positioned in a media disk receiving position. As shall be described more fully below, when the diskette 15 is positioned at a media disk receiving position, the media lockout device prevents normal operation of the guide members 50 and 52 if an attempt to insert the tape cartridge 30 into the tape cartridge receiving position is subsequently made. More particularly, when the diskette 15 is positioned in a media disk receiving position, translation of the sliders 74 and 80 is prevented, rotation of the cranks 76, 82 is prevented, and positioning of the cartridge 32 at the tape cartridge receiving position is correspondingly prevented. Additionally, appropriate movement of the media lockout device causes rotation of the cranks 76, 82 and, when the cartridge 30 is positioned in the tape cartridge receiving position, such rotation of the cranks causes ejection of the cartridge 30 out of the cartridge receiving position.

The exploded view of FIG. 5 illustrates portions of the media drive 10. The left crank 76 and left slider 74 are positioned at a left side of a chassis 120, and the right slider 80 and right crank 82 are positioned at a right side of the chassis 120. The left and right cranks 76 and 82 are permitted limited rotational movement and the left and right sliders 74 and 80 are permitted limited translation. The tangs 112 and 113 of the crank 82 are again shown as is an additional tang 124 formed upon the crank 82. Upper and lower tangs 128 and 130 and forward tang 131 of the slider 80 are further illustrated.

Analogously, the left crank 76 includes similarly-numbered tangs 112, 113, and 124. And, the left slider 74 includes upper and lower tangs 128 and 130 and forward tang 131.

The left slider and crank 74 and 76 are intercoupled such that clockwise rotation of the crank 76 pulls the slider 74 downwardly and forwardly, and vice versa. Similarly, clockwise rotation of the crank 82 pulls the right slider 80 downwardly and forwardly, and vice versa. Also, translation of the sliders 74 and 80 induces rotation of the cranks 76 and 82, respectively. Aftward translation of the sliders induces counterclockwise rotation of the cranks, and forward translation of the sliders induces clockwise rotation of the cranks.

The media drive 10 further includes left and right tape release arms 134 and 136. The left and right tape release arms 134 and 136 are pivotally coupled to the chassis 120 by way of embossed buttons 138 and 142 formed along the lengths of the respective arms. Flanged tabs 144 and 146 of the tape release arm 134 are inserted through slotted openings 148 and 152 extending through the chassis 120 to support the tape release arm 134 thereat, while permitting pivotal movement of the tape release arm about the embossed button 138 which is inserted into an aperture 154.

Analogously, the tape release arm 136 includes flanged tabs 154 and 156 which are inserted through slotted openings 158 and 162 formed through the chassis 120 to support the tape release arm 136 in position while permitting limited rotational movement of the tape release arm about the embossed button 142 which is inserted into an aperture 164.

A downwardly extending tab 166 is positioned at an end portion of the tape release arm 134, and a downwardly extending tab 168 is positioned at an end portion of the tape release arm 136. The tape release arm 136 further includes a slot 172.

The media drive 10 further includes a longitudinally extending lockout arm 180 which includes a tab 182 positioned at a front side portion thereof. The tab 182 engages with the slot 172 of the tape release arm 136.

The lockout arm 180 further includes a tab 186 formed along a left side of the arm along the length thereof. The lockout arm 180 further includes a tab 188 positioned at an aft end portion of the arm.

An actuation arm 192 includes an actuation force receiving surface 194 formed at a front side portion thereof. The actuation force receiving surface 194 receives actuation forces generated in an actuation direction and, responsive to such actuation forces, aftward translation of the actuation arm 192 is permitted. While not shown in the figure, a button member may be affixed to the front portion of the actuation arm 192 to form the actuation force receiving surface 194. The actuation arm 192 further includes upper and lower tabs 196 and 198.

The media drive 10 further includes a shuttle assembly formed of an upper shuttle 202 and a lower plate member 204 which are together positioned above the chassis 120. The shuttle assembly formed of the upper shuttle 202 and lower plate 204 are together operative to receive a media disk, such as the diskette 15 shown in FIG. 1, therein and to position the media disk at a media disk receiving position.

The upper shuttle 202 includes a plurality of tabs 208 and a downwardly projecting tab 212. The lower plate 204 includes angled slots 214 and 218 which engage with mated structure of the upper shuttle 202. While not shown in the figure, corresponding angled slots are formed along the right side of the plate 204. The lower plate further includes an aftwardly-positioned tab 220 and a tab 222. The lower plate 204 is permitted limited forward and aftward translation. The upper shuttle 202 is permitted limited vertical translation defined by the angled nature of the slots 214 and 218 responsive to the forward and aftward translation of the lower plate 204 by way of conventional engagement between the shuttle and the lower plate and operation of the shuttle assembly in conventional manner.

The media drive 10 further includes a floppy release arm 228 which is pivotally coupled to the chassis 120 by way of a pivot 232 formed upon the chassis. The floppy release arm 228 forms a shutter arm for retracting a shutter formed on a conventional diskette, such as the diskette 15 shown in FIG. 1, in conventional manner. The floppy release arm includes an end face, or nose portion, 234 which abuts against the media disk in conventional manner. The release arm 228 further includes a radially-positioned flange 236 having a downwardly projecting tab 238. A radially extending slot 245 is formed behind the flange 236. A bias spring 248 is further illustrated in the figure and is positioned about the pivot 232 to provide a spring bias force to the release arm 228.

Figure 6:
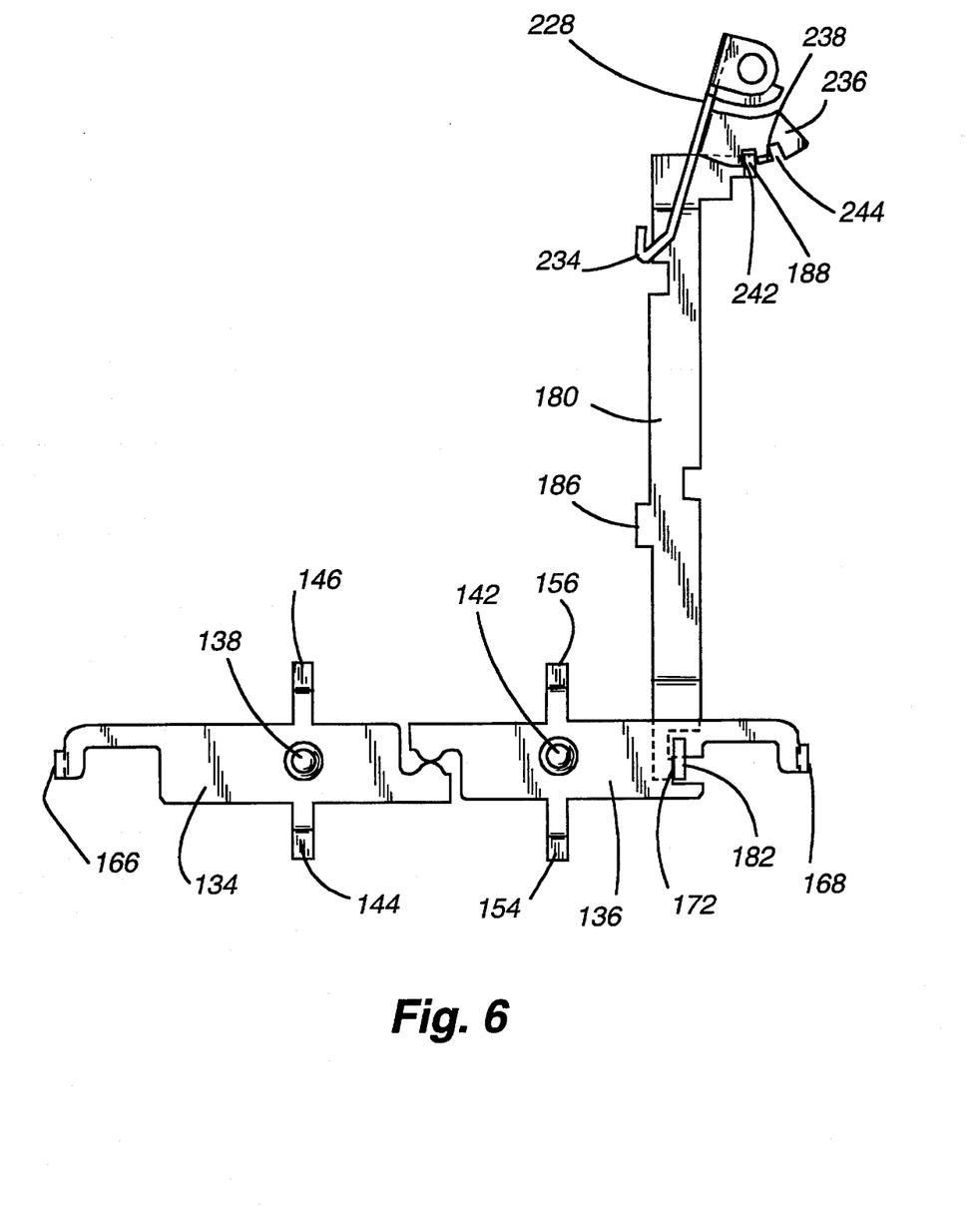
FIG. 6 is an elevational view, in isolation, of the media lockout device forming a portion of the media drive shown in FIGS. 1 and 5.
Figure 7:
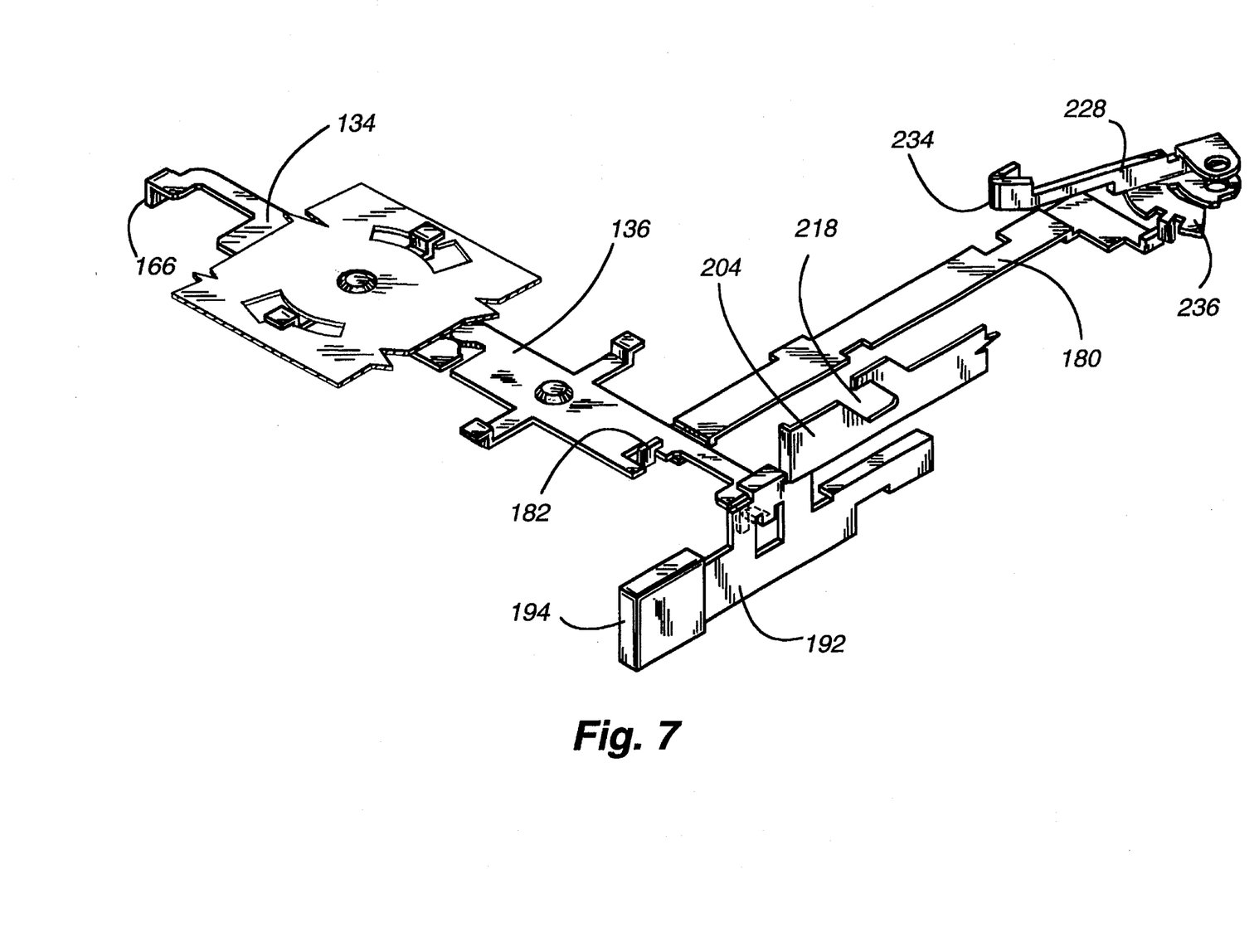
FIG. 7 is a partial perspective view of the media lockout device shown in FIG. 6 together with a portion of the media drive.
Figure 8:
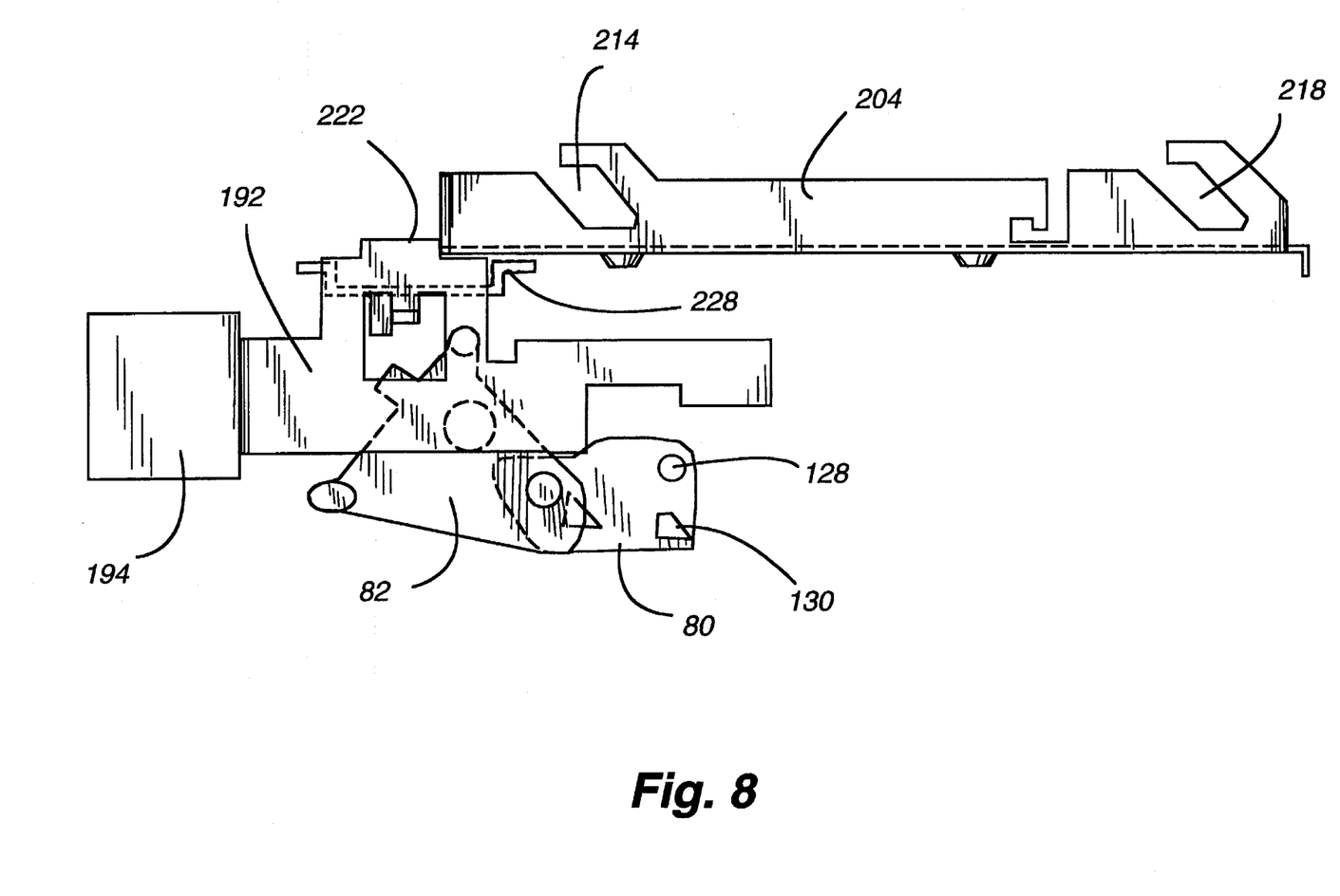
FIG. 8 is a side elevational view of the media lockout device shown in FIGS. 5–7 together with a portion of the media drive.

The elements of the media lockout device of an embodiment of the present invention are again shown in FIGS. 6, 7, and 8 in engagement with one another. Elements common to those shown in FIG. 5 are similarly-numbered.

The media lockout device permits positioning of either the tape cartridge 30 or the diskette 15 at an appropriate media receiving position within the media drive 10, but prevents simultaneous positioning of both storage media at the respective media receiving positions. That is to say, when the floppy disk is inserted into the media drive to be positioned at a media disk receiving position, the media lockout device prevents subsequent positioning of the tape cartridge 30 at the tape cartridge receiving position. Conversely, when the tape cartridge 30 is positioned at a tape cartridge receiving position, the media lockout device prevents positioning of the diskette 15 at the media disk receiving position.

For instance, when the diskette 15 is inserted into the media drive 10 to be positioned at the media disk receiving position, aftward translation of the diskette 15 causes the diskette to abut against the nose 234 of the release arm 228. Forces applied by the translation of the diskette cause clockwise rotation of the release arm 228.

Continued rotation of the release arm 228 releases the tab 220, initially engaged in the radially-extending slot 245, out of engagement with the slot 245. Spring forces generated by springs (not shown) urge forward translation of the plate 204. When the tab 220 is positioned in the slot 245, forward translation of the plate is prevented. Once the tab 220 is released out of engagement with the slot 245, forward translation of the plate 204 is permitted. Forward translation of the plate 204 causes downward translation of the upper shuttle 202 due to its engagement with the slots 214 and 218 by way of the tabs 208. The diskette is thereby positioned at the media disk receiving position.

Such downward translation of the upper shuttle 202 causes the downwardly projecting tab 212 thereof to extend through the chassis 120 to be positioned in front of a front edge of the tab 186 of the lockout arm 180. Such abutting engagement between the tabs 212 and 186 prevents forward translation of the lockout arm 180 as long as the diskette 15 is positioned at the media disk receiving position.

Because forward translation of the lockout arm 180 is prevented, insertion of a tape cartridge 30 into the tape cartridge receiving position is prevented. If an attempt is made to insert the tape cartridge 30 into the tape cartridge receiving position, the cartridge 30 abuts against the tabs of the sliders 74 and 80 which generate forces to attempt to cause counterclockwise rotation of the cranks 76 and 82 associated therewith. The tangs 113 of the cranks 76 and 82 abut against the tabs 166 and 168 of the tape release arms 134 and 136. Forces exerted upon the tabs 166 and 168 by the tangs 113 attempt to induce rotation of the arms 134 and 136. However, because the slot 172 of the tape release arm 136 engages with the tab 182 of the lockout arm 180, and forward translation of the lockout arm 180 is prevented, rotation of the tape release arm 136 and, in turn, of the tape release arm 134 is prevented. Because rotation of the tape release arms 134 and 136 is prevented, the engagement of the tabs 166 and 168 of the tape release arms with the tangs 113 of the cranks 76 and 82 prevents rotation of the cranks and, in turn, prevents further insertion of the tape cartridge 30 into the media drive.

When an operator desires to remove the diskette 15 out of the media disk receiving position, an actuation force is applied to the actuation force receiving surface 194 of the actuation arm 192. Generation of the actuation force causes aftward translation of the actuation arm 192 and the tab 196 of the actuation arm to abut against the tab 222 of the plate 204. Continued exertion of the actuation force causes aftward translation of the plate 204. Aftward translation of the plate induces upward translation of the upper shuttle 202. As the plate 204 is translated aftwardly, the tab 220 slides into the slot 245, and a spring force generated by the spring 248 causes counterclockwise rotation of the arm 228. Counterclockwise rotation of the arm 228 generates an ejection force to cause withdrawal of the diskette 15 out of the media drive.

Analogously, insertion of the tape cartridge 30 into the media drive 10 to position the tape cartridge 30 at a tape cartridge receiving position prevents subsequent insertion of the diskette 15 into the media disk receiving position. As the tape cartridge 30 is inserted into the media drive, the tape cartridge abuts against tabs of the left and right sliders 74 and 80. Continued translation of the tape cartridge into the media drive causes counterclockwise rotation of the cranks 76 and 82. The details of operation of the structure of the media drive 10 to position the cartridge 30 in a tape cartridge receiving position are, as noted previously, disclosed in co-pending patent application Ser. No. 08/334,564 entitled OVER-CENTER VARIABLE STROKE LATCHING MECHANISM AND METHOD FOR A TAPE DRIVE.

As the cartridge is inserted into the media drive, the cartridge abuts against the tangs of the sliders 74 and 80 to induce aftward translation of the sliders. Aftward translation of the sliders induces counterclockwise rotation of the cranks 76 and 82. The tangs 113 engage with the tabs 166 and 168 of the release arms 134 and 136. Rotation of the release arm 136 induces forward translation of the lockout arm 180 due to the engagement of the tab 182 with the release arm 136. Forward translation of the arm 180 causes the tab 188 thereof to abut against the tab 238 of the release arm 228. Such abutment of the tabs 238 and 188 prevents rotation of the release arm 228 and prevents insertion of the diskette 15 into the media disk receiving position.

If an attempt is made to insert a diskette 15 into the media drive, the diskette abuts against the nose 234 of the release arm 228. However, rotation of the release arm 228 is prevented. Further translation of the diskette 15 into the media drive is thereby prevented.

When an operator of the media drive 10 desires to eject the tape cartridge 30 out of the media drive, the operator may merely grasp a portion of the cartridge 30 which protrudes beyond the media drive 10 and exert a withdrawal force upon the cartridge to eject the cartridge out of the media drive 10.

Alternatively, the operator of the media drive may exert an actuation force upon the actuation force receiving surface 194 of the actuation arm 192. Such actuation force causes aftward translation of the actuation arm 192. Aftward translation of the actuation arm causes the tab 198 to abut against the tab 168 of the release arm 136. Continued application of the actuation force induces counterclockwise rotation of the release arm 136. The tab 168 exerts a force to induce clockwise rotation of the crank 82, and forward translation of the slider 80.

The counterclockwise rotation of the release arm 136 induces clockwise rotation of the arm 134. The tab 166 exerts a force to cause rotation of the crank 76 and forward translation of the slider 74.

An extraction force to extract the tape cartridge 30 out of the media drive is thereby exerted upon the tape cartridge 30 at either side of the cartridge.

Rotation of the release arm 136 also induces translation of the lockout arm 180 to disengage the tab 188 thereof abutting engagement with the tab 238. Once the tab 188 disengages with the release arm 228, the diskette 15 may be inserted into the media disk receiving position.

The lockout device thereby permits either the diskette 15 or the tape cartridge 30 to be inserted into the media drive 10 to be received at an appropriate media receiving position. The lockout device prevents simultaneous positioning of both storage media at receiving positions.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed is:

1. Manually operable storage media ejection apparatus for a computer mass storage media drive having a first insertion opening for removably receiving a first storage media at a first storage media receiving position, and having a second insertion opening for removably receiving a second storage media at a second storage media receiving position, said ejection apparatus comprising:

a first spring biased ejection force generating mechanism for generating a first ejection force that is operable to eject a first storage media out of said first storage media receiving position when a first storage media is positioned thereat, a second spring biased ejection force generating mechanism for generating a second ejection force that is operable to eject a second storage media out of said second storage media receiving position when a second storage media is positioned thereat; and a single manually movable actuator cooperating with said first and second ejection force generating mechanism and operative, when said manually movable actuator is actuated, to initiate generation of said second and first ejection forces.

2. The ejection apparatus of claim 1 wherein said actuator comprises a movable actuation arm having an actuation force receiving surface, said actuation arm initiating said generation of said first and second ejection forces by said first and second ejection force generating mechanism when a manual actuation force is applied to said actuation force receiving surface.

3. The ejection apparatus of claim 2 wherein said actuation arm further comprises a first and a second interlinking member for engaging with said first and second ejection force generating mechanism, said actuation arm and said first and second interlinking members being translatable responsive to application of said manual actuation force to said actuation force receiving surface, and said first and second ejection force generating mechanism being operative to generate said first and second ejection forces responsive to said translation of said first and second interlinking members.

4. The ejection apparatus of claim 3 wherein the computer mass storage media drive further includes an exterior face surface, and wherein said actuation arm extends beyond said face surface to thereby expose said actuation force receiving surface.

5. The ejection apparatus of claim 4 wherein positioning of a first storage media at said first storage media receiving position or, alternately, wherein positioning of a second storage media at said second storage media receiving position, causes translation of said actuation arm into a position such that said actuation arm extends outward beyond said face surface.

6. The ejection apparatus of claim 5 wherein a first storage media comprises a media disk and wherein said first ejection force generating mechanism comprises a shuttle assembly having an upper shuttle and a lower plate member, said shuttle assembly removably retaining a media disk, for moving the media disk, once retained thereat, into said first storage media receiving position, and a spring-biased release arm that cooperates with said first interlinking member for ejecting the media disk out of said first storage media receiving position when said manual actuation force is applied to said actuation force receiving surface.

7. The ejection apparatus of claim 5 wherein a second storage media comprises a tape cartridge and wherein said second ejection force generating mechanism comprises a spring-biased latching means cooperating with said second interlinking member for removably retaining the tape cartridge, for moving the tape cartridge, once retained thereat, into said second storage media receiving position, and for ejecting the tape cartridge out of said second storage media receiving position when said actuation force is applied to said actuation force receiving surface.

8. A method for manually ejecting a first or a second storage media out of a computer mass storage media drive, the drive having a first insertion opening for receiving a first storage media at a first storage media receiving position, and the drive having a second insertion opening for receiving a second storage media at a second storage media receiving position, said method comprising the steps of:

providing one manually movable storage media ejection actuator;

providing a first and a second force generating means responsive to movement of said actuator;

applying an actuation force to said actuator;

generating a first storage media ejection force by said first force generating means responsive to said application of said actuation force to said actuator, said first ejection force operating to eject a first storage media out of said first storage media receiving position when a first storage media is positioned thereat, and generating a second storage media ejection force by said second force generating means responsive to said application of said actuation force to said actuator, said second ejection force operation to eject a second storage media out of said second storage media receiving position when a second storage media is positioned thereat.

9. In a computer media drive having a first insertion opening for permitting insertion of a disk therethrough to position the disk at a disk receiving position, and having a second insertion opening for permitting insertion of a tape cartridge therethrough to position the tape cartridge at a tape cartridge receiving position, a manual disk/cartridge ejection apparatus comprising:

a first ejection force generating mechanism for generating a first ejection force to eject a disk out of said disk receiving position when a disk is positioned thereat, a second ejection force generating mechanism for generating a second ejection force to eject a tape cartridge out of said tape cartridge receiving position when a tape cartridge is positioned thereat; and one manually operable actuator that is operative, when actuated, to initiate generation of said first and second ejection forces by said first and second ejection force generating mechanism.

\* \* \* \* \*